Sept. 29, 1931.  J. E. ALLAN ET AL  1,825,570
METHOD OF AND APPARATUS FOR MANUFACTURING
INSULATED ELECTRIC CABLES
Filed Nov. 5, 1928  5 Sheets-Sheet 1
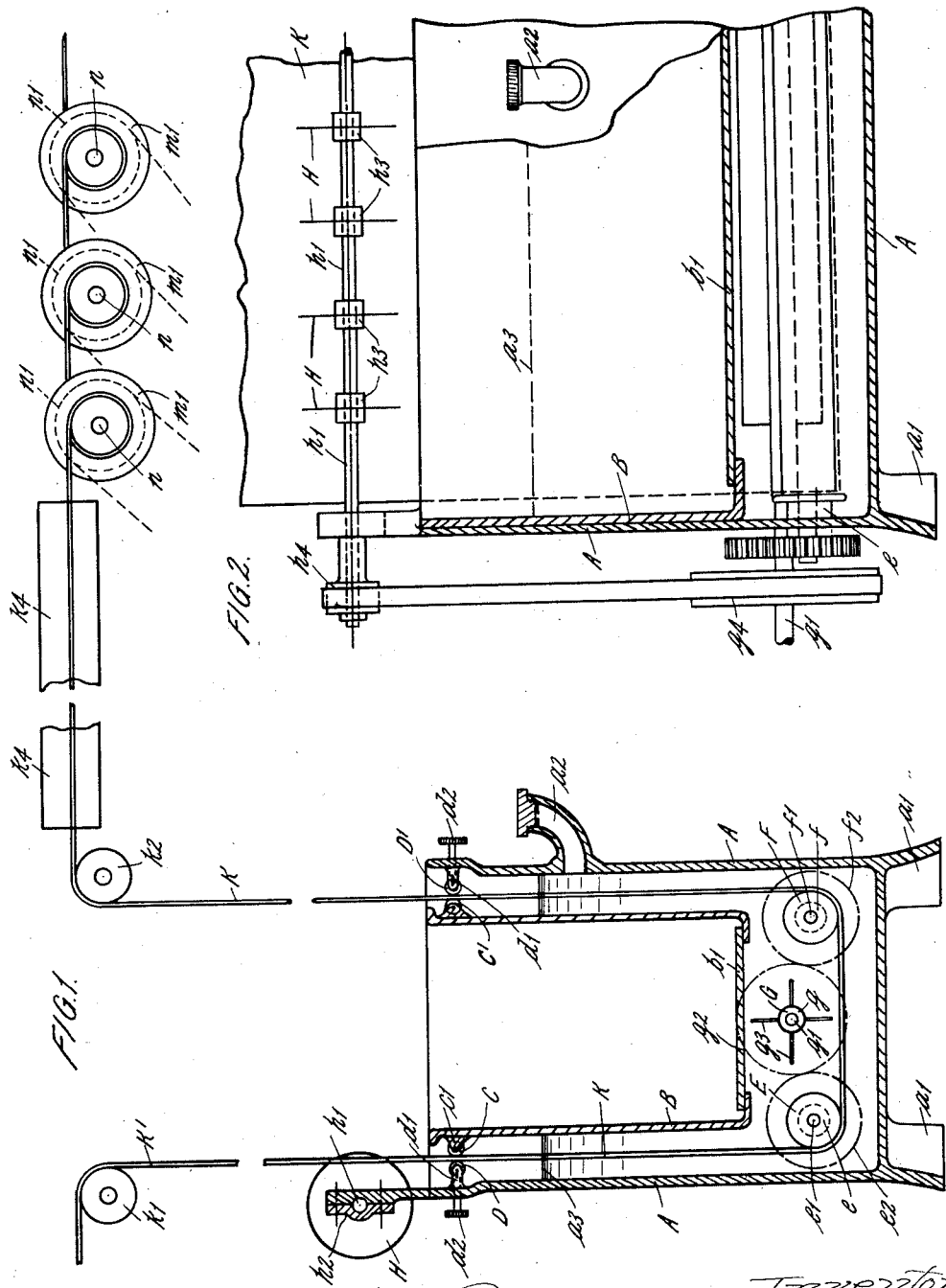

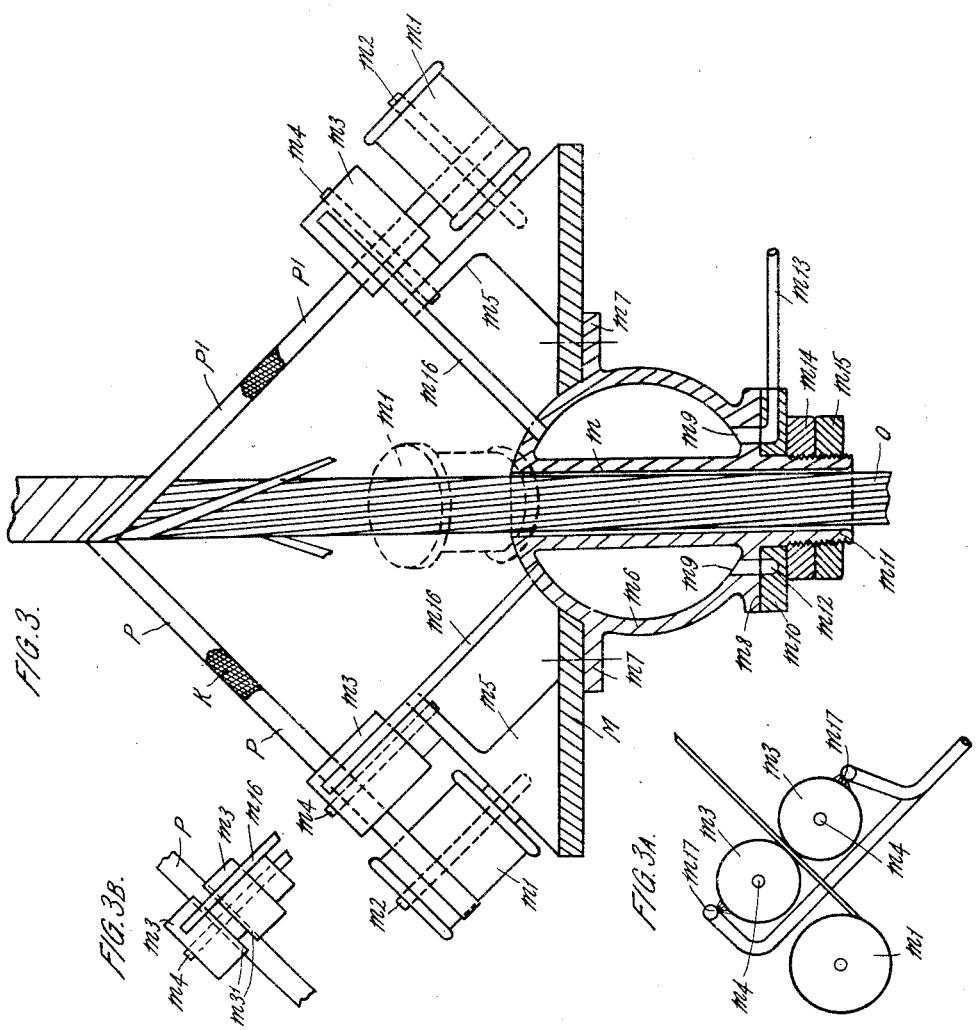

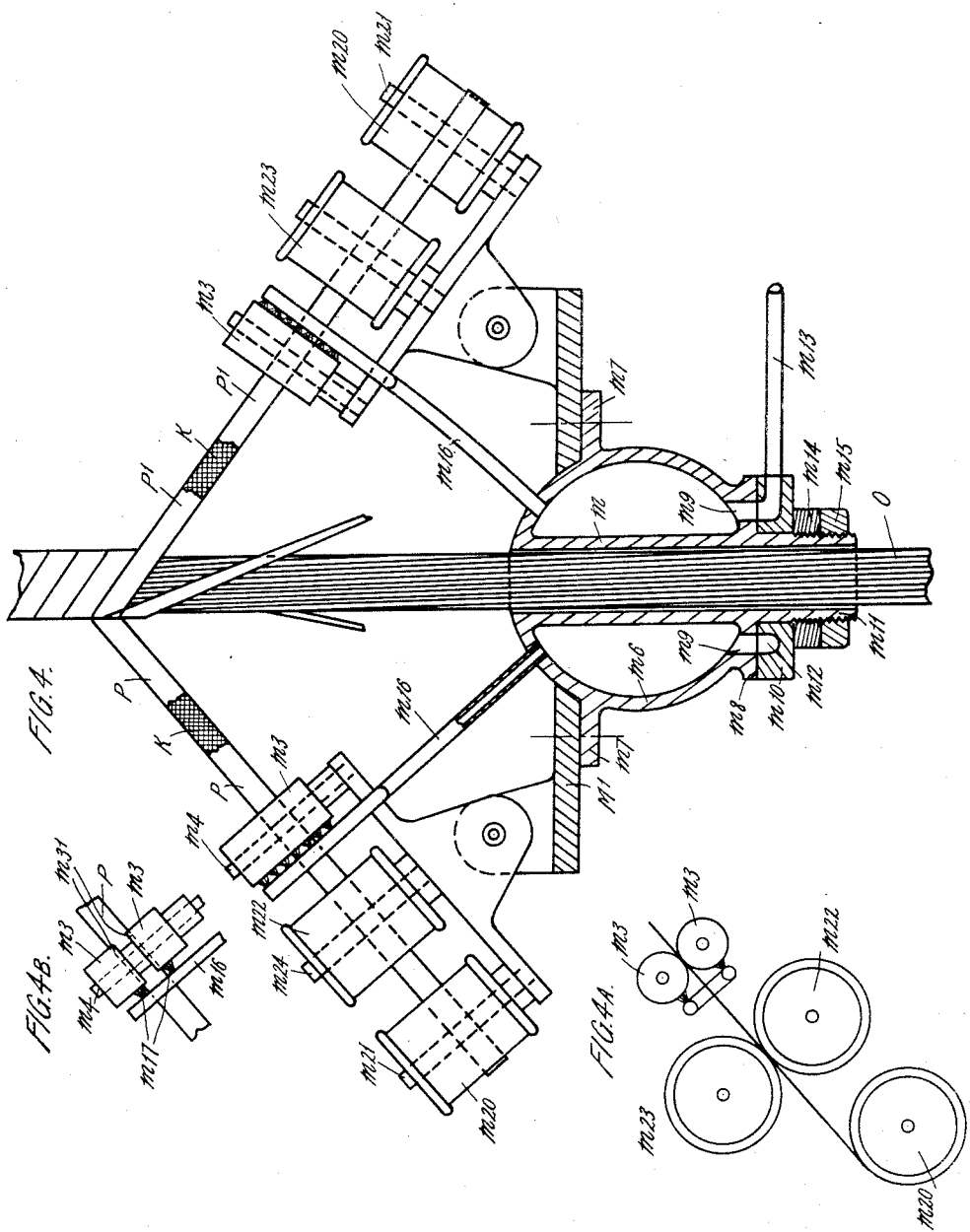

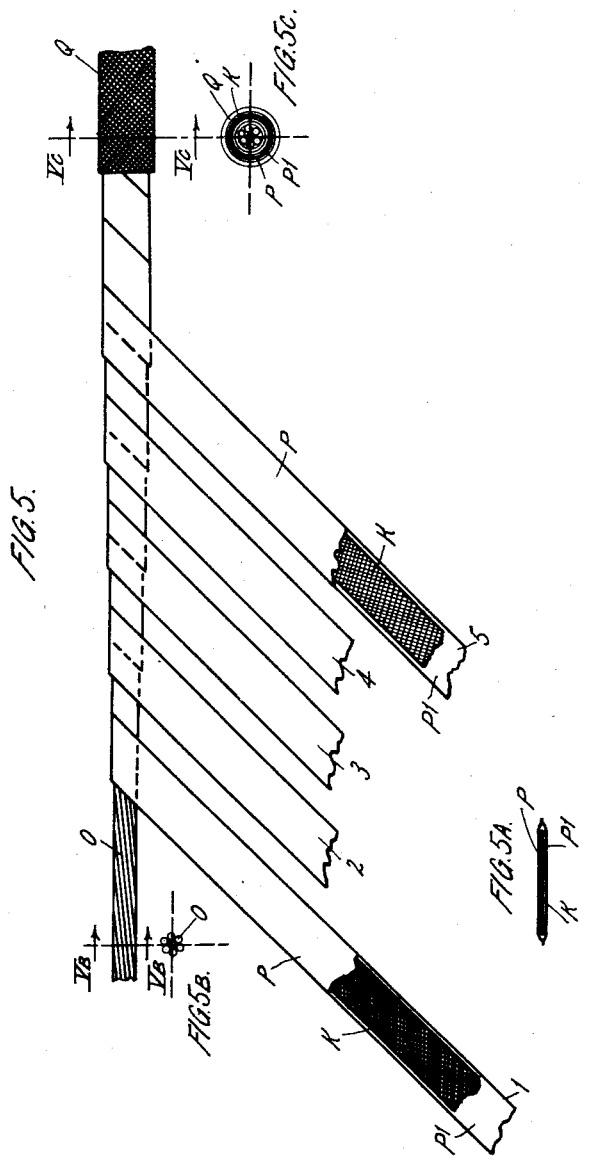

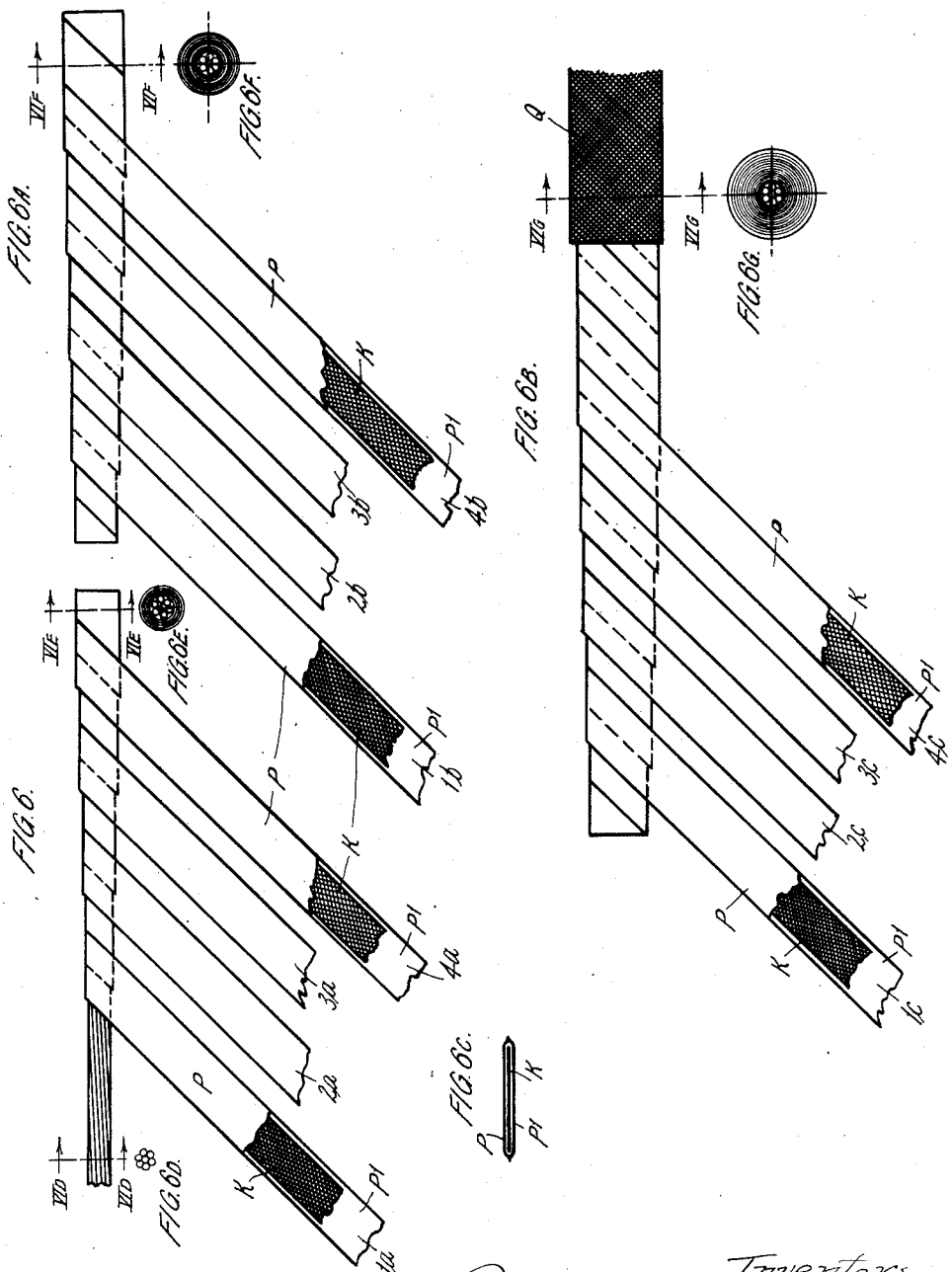

Patented Sept. 29, 1931

1,825,570

UNITED STATES PATENT OFFICE

JOHN EDWARD ALLAN AND STERRY BAINES FREEMAN, OF BIRKENHEAD, ENGLAND

METHOD OF AND APPARATUS FOR MANUFACTURING INSULATED ELECTRIC CABLES

Application filed November 5, 1928, Serial No. 317,288, and in Great Britain March 4, 1927.

This invention relates to the insulation of electric conductors, and the object is to provide such conductors in which the dielectric relied upon for insulation is reverted or esterified cellulose, so applied that the insulated conductor may be manufactured in lengths and be sold in coils and possesses the necessary transverse flexibility to permit bending and handling. Such insulated conductors are particularly suitable for use in positions in which they are subject to unusually high or low temperatures, or to the action of oil, as for example in engine rooms and stoke-holds in which oil fuel is employed and in which there is an oil-laden atmosphere.

Conductors in which the necessary thickness of cellulose insulation is applied in a single thickness are not suitable for general use; they are not sufficiently flexible to permit the usual handling and bending to which cables and wires are subjected without cracking the insulation. In order therefore to provide the necessary flexibility the conductor is, according to our invention, insulated by a series of layers each of which may be applied in single or multiple thickness of homogeneous reverted or esterified cellulose, the respective cellulose layers being separated by a layer or layers of yielding and pliable material such as fabric tape or the like.

This may be accomplished by coating a thin pliable tape of any suitable material, for example cotton or linen fabric, on one or both sides with a continuous but comparatively thin surface composed of homogeneous reverted or esterified cellulose, for example such salts of cellulose as nitro-cellulose, amyl-cellulose, acetate-cellulose and the like, to which is added castor or other suitable oil to increase toughness; non-conducting pigments may also be added; for the sake of brevity this composition will be referred to hereinafter as cellulose composition. The tape so prepared is employed to insulate the conductor by covering the conductor to the necessary radial thickness by means of multiple layers of the said tape, applied spirally or longitudinally, so as to ensure a joint, made with amyl-acetate or suitable solvent, between the edges of the cellulose composition surfaces carried by the tape, and so that the said edges are united to form a continuous, enclosing and hermetically sealed cellulose composition insulation.

Instead of coating the sides of the fabric tape with a layer of cellulose composition attached thereto, the fabric tape, and a corresponding tape of homogeneous cellulose composition, or two such tapes, one on each side of the fabric tape, may together be fed to the spiral or longitudinal taping machine. The width of cellulose composition tape is preferably made greater than that of the fabric tape so that the overlapping edges may be jointed by a suitable solvent as the tape or tapes is or are applied.

Where such tape is applied spirally the overlapping spiral edges of the cellulose composition surfaces are united, as the act of winding proceeds, with a suitable solvent such as amyl-acetate, so that the spirally applied layers of cellulose composition form a continuous enclosing insulating covering.

Where the combined tape of fabric and cellulose is applied longitudinally, the longitudinally disposed overlapping edges of the cellulose composition surfaces are united by a suitable solvent so as to give a continuous and enclosing sheathing of cellulose composition, the necessary dielectric thickness being obtained as before by employing multiple tapes.

In order to obtain the required flexibility of the layers of cellulose composition covering it is necessary that these layers should be comparatively thin, and the necessary strength required for finished product, and that necessary during the process of insulating the conductor, is obtained by utilizing the fabric tape as a continuous but flexible support for the thin surfaces of cellulose composition applied to the opposite sides of the tape, the object being to provide a tape which shall carry two exceptionally thin but continuous layers of cellulose composition which are separated, supported and strengthened by the fabric tape between them, the tape between the two cellulose composition surfaces being sufficiently flexible, and the said surfaces being sufficiently thin to permit, in a multi-layer insulation, the necessary interlayer movement required to provide the desired flexibility to permit bending.

The conductor thus provided with its inner sheath of multiple layer cellulose composition insulation may be mechanically protected, and be further insulated by being taped or braided, or be lapped with parallel strands of a suitable fabric such as cotton applied in the usual manner, and such fabric may, in the act of laying, or previously, be served with the cellulose composition, and the insulated conductor so formed may finally be served with a protective coating of cellulose composition.

As stated, the cellulose composition employed would include a toughening agent such as castor oil, or other suitable vegetable oil; non-conducting pigments may also be incorporated in the cellulose composition and with the outer covering, said pigments also serving, in the case of multiple core cables, for identification purposes.

The insulating properties of cables constructed in the manner described are found to be unaffected by comparatively high temperatures, or by the presence of oil, and are found to maintain their insulating properties unimpaired when subjected to test by immersion for comparatively long periods in oil at the temperature as usually experienced in practice.

The mode in which the thin layers of cellulose composition are applied so as to give series of continuous enclosing sheaths having the necessary flexibility, may be varied in accordance with the type, class and duty of the insulated conductors to which the invention is applied.

The mode of applying tape and insulation, for example fabric tape and rubber, to electric conductors either by spiral or longitudinal wrapping is well known to those skilled in the art, and those so skilled would be able to apply the layers of tape and cellulose composition in the manner described; the standard of insulation and the corresponding cost being varied as required by varying the percentage of insulating pigment or the like powder in the cellulose composition.

We have, in the accompanying drawings, and by way of example, illustrated suitable modes by which our invention may be carried out. In the drawings:—

Figs. 1 and 2 show suitable apparatus for coating the pliable tapes with the cellulose composition.

Fig. 1 being an elevation in transverse section, and

Fig. 2 an elevation in part longitudinal section.

Fig. 3 is a diagrammatic plan of the rotating head of a machine for applying the tapes to the conductor, and Figs. 3A and 3B are detail views of a reel and wiper rollers, viewed in the direction of the arrow IIIA.

Figs. 4, 4A and 4B are views similar to Figs. 3 and 3A and illustrate a modification.

Fig. 5 is a diagrammatic view showing the order of winding.

Fig. 5A is an enlarged transverse section of a tape, and

Figs. 5B and 5C are sections on the lines VB and VC.

Figs. 6, 6A and 6B are views similar to Fig. 5 and show the order of winding three groups of coated tapes.

Fig. 6C is an enlarged transverse section of the tape, and

Figs. 6D, 6E, 6F and 6G are sections on the lines VID, VIE, VIF, VIG respectively.

Referring first to Fig. 1 which shows a suitable arrangement for coating a web of fabric, such as cambric or the like, which is cut by a series of transversely arranged rotary cutters so as to form a series of tapes of suitable widths. A is an open-topped outer tank suported on feet $a1$ and provided with a filling opening $a2$, which tank is charged with the cellulose composition to a level such as $a3$. Within the tank A is an inner tank B, the transverse dimensions of which are somewhat less than those of the tank A, and the longitudinal dimension of which may be such that its ends make joint with the insides of the ends of the tank; the tank B is fitted with an inspection door $b1$. C is a longitudinal roller fitted in the space between the two tanks, the bearings $c1$, of which may be fixed to the tank B, and D is a roller carried in a bearing $d1$, movable transversely, and adjusted by screws $d2$ so that the distance between the rollers D and C may be varied; C' and D' are similar rollers on the other side of the tank; E and F are rollers carried in suitable bearings $e$ and $f$ formed in the end of the tank A, their spindles $e1$ and $f1$ projecting beyond the tank and have keyed to them spur wheels $e2$ and $f2$. G is a rotating agitator, carried in bearings $g$ in the tank A, and having a spindle $g1$ which projects beyond the tank, and has keyed to it a spur wheel $g2$, which gears with the spur wheels $e2$ and $f2$; $g3$ are arms which may be of any suitable shape adapted to agitate the composition in the tank. H are rotary knives carried on a spindle $h1$ the bearings $h2$ of which are carried from the sides of the tank A. The spindle H is screw-threaded and the knives are held in position by nuts $h3$ so that the pitch of the knives may be adjusted to suit the width of tape required.

A pulley $h4$ is keyed to the shaft $h1$ and is belted to a pulley $g4$ on the shaft $g1$, which latter may be the driving shaft of the machine.

The web of fabric K' is led from a suitable roll or web over a guide roller $k1$ and between the rollers C and D; it is then cut by the knives H and is passed round the rollers E and F, up between the rollers C' and D', on the opposite side of the tank, over the guide roller $k2$; the several tapes K are led onto the respective reels $m1$, being, if necessary, led through any suitable form of dryer $k4$ located between the roller $k2$ and the winding reels $m1$.

The spindles $n$ of the reels $m1$ have driving pulleys $n1$ which are driven in any suitable manner, for example, by being belted to a common pulley on the shaft $g1$.

The rollers C' and D' serve to wipe off the surplus solution, and as the web is cut into strips by the knives H the series of tapes K so formed are effectively coated by the composition, the level $a3$ of which is selected so as to give a head of liquid sufficient for this purpose. The agitator ensures the composition being thoroughly mixed, and as the fabric is cut into tapes preferably before it enters the tank the film of cellulose composition envelopes the cut edges.

Where tapes woven to suitable widths are employed instead of tapes cut from the web as described, such tapes are fed sides by side through the tank A in the manner described in connection with the web K' and tapes K, the adjacent edges of the tapes would be slightly separated to permit the film of cellulose composition to be formed over the edges.

Alternatively the web of fabric, or its individual tapes may be coated by spraying the cellulose composition on both sides thereof with a sprayer such as is employed to spray cellulose composition onto the surfaces of automobile bodies.

Referring now to Figs. 3 and 3A;—The reels $m1$ on which are wound the tapes coated in the manner described, are rotatably mounted on spindles $m2$ carried by a revolving head M of a taping machine such as is employed for taping rubber insulated cables; the head M has a central opening through which the conductor O to be insulated passes, the head M being rotated and the conductor O moved forward longitudinally through the head after the manner well known in connection with taping machines, so as to ensure a spiral "lay" of tapes on the conductor. In the example illustrated there would be four tape reels $m1$ mounted equi-angularly. Each reel would be wound with a pliable tape K coated on each side with a coating P, P' of cellulose composition. Each tape reel would be provided with a pair of smearing rollers $m3$ carried on suitable spindles $m4$ supported in brackets $m5$ from the rotating head M. At its centre the head M is provided with a composition container $m6$ attached to the head by flanges $m7$, the container being pierced by a sleeve $m$ forming a central opening through which the conductor O freely passes. A transverse circular facing $m8$ is formed on the end of the container, and ports $m9$ are formed in the facing $m8$ leading to the interior of the container. A ported disc $m10$ is provided, the bore of which fits an external spigot $m11$ forming an extension of the sleeve $m$ of the container. An annular port $m12$ formed in the face of the disc $m10$, is in communication with the ports $m9$ of the container. A feed pipe $m13$ is screwed into the periphery of the ported disc so that its interior communicates with the port $m12$, and the pipe holds the disc stationary; the joint between the disc and the facing $m8$ being made by a nut $m14$ and a lock-nut $m15$ fitting a screw-threaded portion of the spigot $m11$. A suitable jointing solution such as amyl-acetate is fed by the supply pipe $m13$ to the container $m6$, and passes from this container through pipes $m16$ leading to sprayers $m17$ which spray the solution on the peripheries of the smearing rollers $m3$, which transfer it to both coatings P and P' of the tape K. The tapes are fed on to the conductor in succession, the edges of the convolutions of each layer either just abutting or overlapping; the joint being made by the solution supplied by the smearing rollers $m3$, each succeeding tape as it is laid covering the spiral joints of the tape previously laid.

The smearing rollers and sprayers may be shaped as shown in Figs. 3B and 4B so that the flanges $m3'$ smear the edges only of the cellulose composition coatings.

Instead of coating the fabric tapes on opposite sides with the cellulose composition adherent thereto as described, woven tapes or tapes cut from a web of fabric as described may be employed in conjunction with separate thin coating tapes of cellulose composition, or such cellulose may be tapes cut from webs of cellulose composition tissue, which is now a well known cellulose product, and is obtainable in suitable lengths and thicknesses for this purpose.

The arrangement for winding the composite tapes is shown in Figs. 4 and 4A. In this case the head M' constructed substantially as described in connection with the head M of Fig. 3 has mounted thereon a series of reels $m20$ mounted on spindles $m21$, said reels carrying the fabric tape K, and pairs of reels $m22$ and $m23$ carried on spindles $m24$ carrying the cellulose composition coating tapes P and P', the fabric tape K being fed between the two cellulose tapes P, P', which thus form non-adherent coatings for the tape K, the three tapes being wound together on to the conductor; the fabric tape K serves to support the cellulose tapes P, P' which are much thinner than the fabric tape and more liable than the fabric tape to break under the feed tension, or to become deranged in feeding; fracture and derangement of the cellulose tape are prevented by the support given by the fabric tape K. Four or more sets of such tapes are wound by each head in the manner described, pairs of smearing rollers m3 being carried on spindles m4 supported in brackets m5 from the rotating head M. At its centre the head M is provided with a composition container m6 arranged as described in connection with Fig. 3 and supplied, through a suitable supply pipe m13 leading to the container with a suitable jointing solution or solvent such as amyl-acetate, said solution passing from the container through the pipes m16, to sprayers m17 adapted to apply the solution to the peripheries of the smearing rollers m3 as described in connection with Fig. 3. The smearing rollers transfer the solution to the outer surfaces and the coating tapes P, P'. The solution also finds its way to the junction between the edges of the tapes P, P', which latter are preferably made somewhat wider than the fabric tape K so that these edges are united by the solution.

The fabric tape instead of supporting a single cellulose composition coating tape on each side such as P and P', may be utilized to support two or more cellulose composition tapes on each side, that is to say, the coating layer of cellulose composition between the fabric tapes when laid on the conductor may consist of several thicknesses, and as the smearing rollers would smear the solvent composition on the outside surface only, there would be freedom of movement between the layers of cellulose composition located between the fabric tapes, and this, and the pliable nature of the fabric tape, provides considerable flexibility of the finished product.

The insulation, in the case of comparatively small conductors, may consist of a single group of tapes provided with cellulose coatings, the cellulose surfaces of the tapes being smeared by the smearing rollers m3 with the solvent solution so that the cellulose surfaces in contact when wound are united; or the cellulose surfaces of the last tape to be applied, may be the only ones smeared, the outer surface being afterwards braided. This arrangement is shown diagrammatically in Figs. 5 and 5A. In these figures it is assumed for the sake of clearness of illustration that the tapes are fed on in the one plane; they would, of course, be fed as described in connection with Fig. 3 or Fig. 4. In this case there are five coated tapes fed on, each consists of a fabric tape K covered on both sides with cellulose composition P and P', as shown in Fig. 5A. The tape 1 is the first tape fed on to the conductor, a similar tape 2, the second one to be fed on to the conductor, being arranged to cover the joint between the convolutions of tape 1. In the same way tapes 3, 4 and 5 cover the joints between the convolutions and the preceding tape, the conductor is then braided as at Q by any suitable type of braiding machine, the braiding being served with the cellulose composition. Both coatings of cellulose composition P, P' of each tape may be smeared by the smearing rollers; but in case of small conductors where added flexibility is required, only the said coatings of the outermost tape, in the case illustrated the tape 5, may be smeared by the smearing rollers or alternatively the said coatings of the first and last tapes, in the example illustrated the tapes 1 and 5, may be so smeared. Figs. 5B and 5C show sections of the conductor and of the insulated cable.

The conductor, in the case of comparatively large conductors, may be insulated by several groups of coated tapes, the first group being applied by a head such as M, and succeeding groups being applied by successive heads similar to M, as described in connection with Figs. 3 or 4. The outer surface of the last wound coated tape of the one group, and the inner surface of the first coated tape of the next group to be applied, would not be served with the solvent solution, so as to leave each group free, relatively to the adjacent groups, in order to increase the flexibility of the conductor. This arrangement is shown in Figs. 6, 6A and 6B each of which is a diagrammatic view similar to Fig. 5. As before K is the fabric tape and P and P' the cellulose coatings. Each of the coated tapes 1a, 2a, 3a and 4a of the first group of four tapes are led on to the conductor as described in connection with Fig. 3 or Fig. 4, and in the order shown diagrammatically in Fig. 6. The smearing rollers may be arranged to smear both cellulose composition coatings of each tape, or they may be arranged to smear the outer coating of the tape 1a, and the inner coating of the tape 4a. After the first group of four tapes 1a, 2a, 3a and 4a have been laid by the one head M, a second group 1b, 2b, 3b and 4b are wound in the same way; a third group 1c, 2c, 3c and 4c being then wound, a braiding Q being then applied by a braiding machine and said braiding served with the cellulose composition. The number of such groups wound would depend upon the size of the conductor and the required thickness of dielectric; and the width of the tapes, and pitch of the spirals would be arranged to suit the "lay" desired. Figs. 6D to 6G show the sections at different stages of the winding.

The composition with which the tapes, or the webs of cloth from which the tapes are cut as hereinafter described, are coated, comprises a salt of cellulose, for example, nitrocellulose, amyl cellulose, acetate cellulose or the like, with which is incorporated any of the known pigments or "loadings" at present employed in connection with rubber mixtures for insulating cables, together with a suitable oil such as castor oil, to which, where a varnish finish is desired, a suitable varnish or mastic is added.

Any of the cellulose varnishes used for spraying the bodies of motor cars and the like may with advantage be employed as the basis of the composition. To this varnish is added the necessary pigment in the form of china clay or other non-conductive material.

A suitable bath may also be prepared as follows:—

| | Per cent |
|---|---|
| Nitro cellulose | 5 |
| Alcohol | 20 |
| Benzol | 20 |
| Butyl acetate | 40 |
| Butyl alcohol | 10 |
| Ethyl acetate | 4.5 |
| Castor oil | 0.5 |

To this composition is added the desired quantity of pigment or loading which may be china clay or the like non-conducting material.

Where woven tapes are employed instead of tapes cut from the web as described, and these have to be coated in the tank, the distance between the adjacent edges of adjacent tapes is preferably so adjusted that as the tapes emerge from the outlet guide rollers C' and D' the film of cellulose composition which is formed on opposite sides of the tape extends, as a thin web, between the tapes, said webs being severed as the tapes are wound on the reels m1.

The speed at which the tapes are fed through the bath is such that the necessary thickness of coating is applied, and such that the fabric of the tape is not impregnated by the cellulose composition to the extent which would render the tape stiff and non-pliable, the object being to provide a continuous thin film or coating of cellulose composition on each side of the tape, the said coating extending over the edge of the tape, as described, so that the fabric is completely enclosed, the threads of the fabric are however left free to move or slide relatively to each other so as to give the insulation the necessary flexibility, which if it were composed entirely of the cellulose composition it would not possess, and the tapes are preferably woven so as freely to permit this relative movement of the threads.

The cellulose in the composition employed in the bath is very volatile, and with an open form of bath there would be a considerable waste by evaporation, which evaporation is prevented by the employment of the enclosed form of bath described.

Tapes having an adherent coating of cellulose composition as described, or having non-adherent coatings in the form of cellulose tapes as described, may be applied to the conductors not only by spiral winding machines as described but also by longitudinal taping machines such as are used for taping rubber insulated cables with longitudinally applied tapes; the width of the tape corresponding with the circumference of the conductor, and the abutting or slightly overlapping longitudinal joint being made with a solvent such as amyl acetate, the multiple layers being obtained by successively applying a number of such tapes.

The cables insulated as described, in addition to being braided, may have a mechanical protection such as lead sheathing and steel armouring, and individual cables insulated as described may be made into multiple cables, the group of multiple cables being insulated in the manner described and if necessary protected by lead sheathing and armouring.

Conductors insulated as described are found to be impervious to moisture, are unaffected by oil and grease, are adapted to resist comparatively high temperatures, are comparatively incombustible, and relatively inexpensive to manufacture.

The details of construction of the coating apparatus, the width and the thickness of the tapes, the fabric employed, the thickness of coatings, and the numbers of groups and layers, would be varied in accordance with the size and duty of conductor to be insulated, and the desired total thickness of dielectric required.

Having now fully described our invention, we declare that what we claim and desire to secure by Letters Patent is:—

1. An insulated electrical conductor having multiple layers of cellulose composition separated by layers of pliable material, said layers of pliable material being tapes wound spirally thereon, said layers of cellulose composition being coatings on the said tapes, said tapes being therefore arranged in groups, the cellulose composition coatings of the tapes being united by a solvent solution, with the exception of the inner cellulose composition coating of the first tape of each succeeding group, and the outer cellulose composition coating of the last tape of the preceding group, these excepted coatings being in wrapping contact with each other, but not being united by an adhesive; substantially as described.

2. The improved mode of insulating electric conductors which consists in winding spirally on the conductor successive groups of fabric tapes, the surfaces of the said tapes being coated with a cellulose composition, the coatings of each tape in a group being served with a solvent solution, with the exception of the inner coated surface of the first tape of each group to be wound and with the exception of the outer coated surface of the last tape to be wound in each group except the last group; substantially as described.

3. An insulated electric cable composed of multiple layers of combined fabric and cellulose tapes, and characterized in that the contacting surfaces of some of the successive layers are united together by an adhesive, whilst the contacting surfaces of the other layers are not so united, the sliding freedom thus permitted between certain of the layers combined with the freedom due to the intervening fabric layers increasing the flexibility of the finished insulated cable; substantially as described.

4. An electric cable insulated with multiple layers of cellulose composition separated by layers of pliable material, some of the pairs of contacting surfaces of successive layers being united together, the remaining contacting surfaces of the layers being free so as to permit relative movement between them; substantially as described.

5. An electric cable insulated with multiple layers of cellulose composition separated by layers of pliable material, some of the pairs of contacting surfaces of successive layers of cellulose composition being united together, the remaining contacting surfaces of the cellulose composition layers being free so as to permit relative movement between them; substantially as described.

6. An electric cable insulated by multiple composite tapes of cellulose composition and pliable material, the tapes being disposed spirally on the conductor, each successive tape covering the joint between the edges of the convolutions of the preceding tape, the contacting surfaces of some of the pairs of successive tapes being united together and the remaining contacting surfaces of the pairs of successive tapes being free so as to permit relative movement between them; substantially as described.

7. An electric cable insulated by multiple composite tapes each consisting of a pliable tape having on opposite sides surfaces of cellulose composition, the tapes being disposed spirally on the conductor, each successive tape covering the joint between the edges of the convolutions of the preceding tape, the contacting cellulose surfaces of some of the pairs of successive tapes being united together, the remaining contacting surfaces of pairs of successive tapes being free so as to permit relative movement between them; substantially as described.

8. An electric cable insulated by multiple composite tapes each consisting of pliable material with coatings of cellulose composition on opposite sides united together at their edges so as to enclose the pliable tape, said tapes being disposed spirally on the conductor, each successive tape covering the joint between the edges of the convolutions of the preceding tape, the contacting surfaces of cellulose composition of some of the pairs of successive tapes being united together and the remaining contacting cellulose of the pairs of tapes being free so as to permit relative movement between them; substantially as described.

9. An electric cable insulated by multiple composite tapes of cellulose composition and pliable material, the tapes being disposed spirally on the conductor, each successive tape covering the joint between the edges of the convolutions of the preceding tape, the contacting surfaces of the pair of tapes nearest the conductor and of the outermost pair of tapes, respectively being united together, the number of tapes on the conductor being sufficient to provide one or more tapes intermediate the said pairs, all the contacting surfaces of the intermediate tapes being free, so as to permit relative movement between them; substantially as described.

10. An electric cable insulated by multiple composite tapes of cellulose composition and a pliable material, the tapes being disposed spirally on the conductor in groups, and the contacting surfaces of the several tapes of the group being united together and the inner surface of the inner tapes of each group, being free relatively to the outer surface of the outer tape of the adjacent group; substantially as described.

11. An electric cable as claimed in claim 4, in which the contacting surfaces which are united, are united at the edges only; substantially as described.

12. An electric cable as claimed in claim 4, in which the contacting surfaces are united together by a solvent solution; substantially as described.

13. An electric cable as claimed in claim 7, in which the contacting surfaces of the respective tapes which are united together, are united at the edges by a solvent solution; substantially as described.

14. An insulated cable as claimed in claim 4, in which the outermost layer of tape is provided with a braided cover, and in which the said braided cover is served with a cellulose composition; substantially as described.

15. An electric cable as claimed in claim 4, in which the outermost tape is provided with a braided cover and in which the said cover is served with a cellulose composition; substantially as described.

16. An electric cable as claimed in claim 7, in which the outermost layer of tape is provided with a braided cover and in which the said braided cover is served with a cellulose composition; substantially as described.

17. An electric cable as claimed in claim 1, in which the pliable material is a woven fabric tape; substantially as described.

18. An electric cable constructed in accordance with claim 7, in which the pliable material is a woven fabric tape; substantially as described.

In testimony whereof we have hereunto set our hands.

JOHN EDWARD ALLAN.
STERRY BAINES FREEMAN.